April 7, 1936. F. BAKER 2,036,185
MANUALLY OPERATED WATER VEHICLE
Filed Aug. 29, 1935

WITNESS:

INVENTOR.
Freeman Baker
BY
E. W. Cody
ATTORNEY.

Patented Apr. 7, 1936

2,036,185

UNITED STATES PATENT OFFICE 2,036,185

MANUALLY OPERATED WATER VEHICLE

Freeman Baker, Saranac Lake, N. Y.

Application August 29, 1935, Serial No. 38,422

1 Claim. (Cl. 115—22)

My invention has for its object to provide an improved manually operated water vehicle which is provided with a pair of pontoons spaced apart and connected together, a cockpit mounted between the pontoons, provided with a seat at its rear end, a paddle wheel at the rear end of the cockpit, with a shield serving as a back rest at the rear end of the cockpit, means for manually operating the paddle wheel and means for steering the vehicle.

My invention consists of a manually operated water vehicle as hereinafter described, shown and claimed. Referring to the accompanying drawing:

Figure 1:
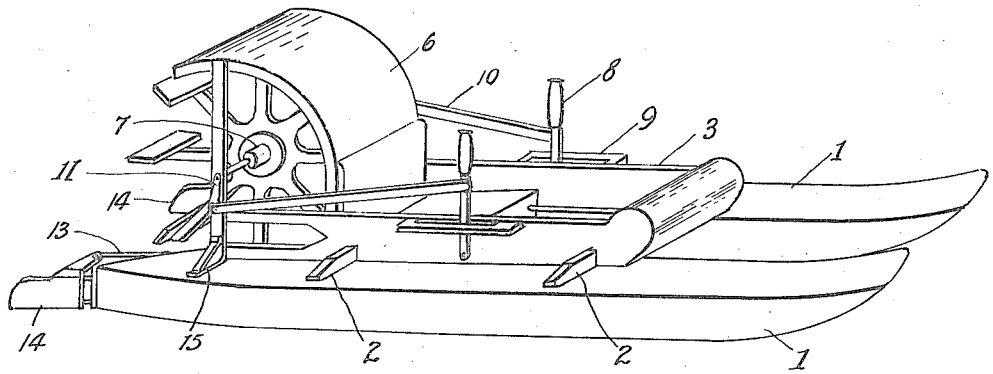
Figure 1 shows a perspective view of the invention.
Figure 2:
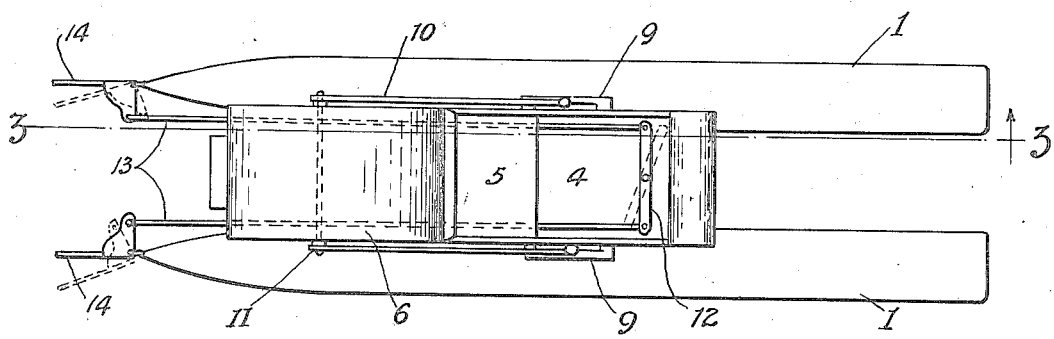
Figure 2 shows a plan view thereof.
Figure 3:
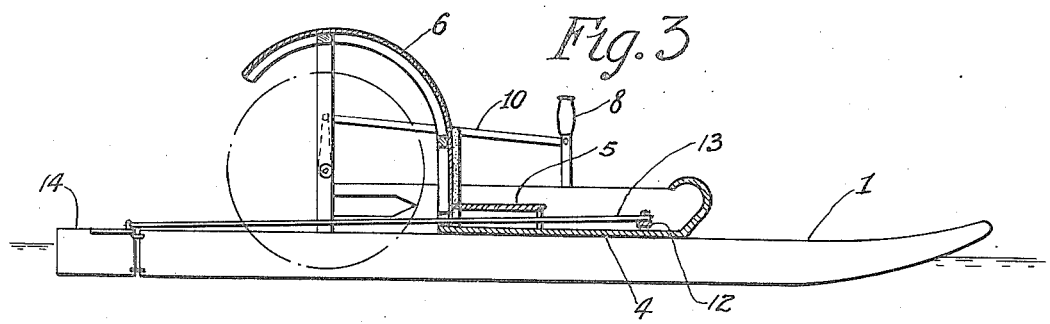
Figure 3 is a side view in longitudinal section through the line 3 of Figure 2.

In carrying out the invention I provide a pair of pontoons 1 of suitable material, such as metal, and spaced apart, and located between the pontoons, 1, is a cockpit 4 having sides 3, the cockpit being secured to the pontoons, 1, by arms 2.

The cockpit 4 has at its rear end a seat 5, behind which is a shield 6 for the paddle wheel 7, which also serves as a back-rest for the occupant of seat 5.

The paddle wheel, 7, is driven by suitable means, such as the hand levers 8, pivoted to the sides of the cockpit, and each adapted to swing in a slotted bracket 9.

Each lever 8 is pivotally connected by a rod 10 to a crank-arm 11 on each end of the shaft of wheel 7.

A steering gear for the water vehicle comprises a centrally pivoted cross-bar 12 at the forward end of cockpit 4, adapted to be operated by the feet, and having at each end a rod 13 pivotally connected to a rudder 14 at the rear end of each pontoon 1.

As shown, each pontoon is curved at its forward end, which enables the vehicle to ride easily over waves and rough water.

The steering of the vehicle is assisted by having a rudder at the end of each pontoon, as the water driven by the paddle wheel will help move the rudders in steering.

In operating the water vehicle the arms 8 connected directly by rods 10 to the crank arms 11 of the paddle wheel 7 provide a simple mechanism for operating the paddle wheel with little exertion.

I claim:

A manually operated boat comprising a pair of spaced pontoons, means forming a cockpit between said pontoon, each pontoon having a rudder at its rear end with an arm, a paddle wheel having crank arms directly behind the cockpit, a box over the paddle wheel and having an inner vertical wall, a seat for the operator of the boat located at the vertical wall of the paddle box, said wall serving to brace the back of the occupant of the seat in operating the boat, a vertical hand operated lever at each side of the cockpit in reach of the occupant of the cockpit, a single rod extending from each hand lever to a crank arm on the paddle wheel, and a steering gear consisting of a foot treadle pivotally mounted midway of its length in the cockpit and operable by the feet of the occupant of the cockpit and a rod extending from said arm on each rudder and connected to an end of each treadle whereby the boat may be steered.

FREEMAN BAKER.